(12) United States Patent
Glauber et al.

(10) Patent No.: US 9,657,676 B2
(45) Date of Patent: May 23, 2017

(54) METHODS AND SYSTEMS FOR POWERTRAIN CONTROL

(71) Applicant: Ford Global Technologies, LLC, Dearborn, MI (US)

(72) Inventors: Samuel Melville Glauber, Northville, MI (US); Robert Wilkinson, Novi, MI (US); Jared Schimke, Ann Arbor, MI (US); Scott Patrick Ries, South Lyon, MI (US); Shawn Adam Holland, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 14/613,771

(22) Filed: Feb. 4, 2015

(65) Prior Publication Data

US 2016/0222903 A1    Aug. 4, 2016

(51) Int. Cl.
*F02D 41/24*   (2006.01)
*B60W 50/08*   (2012.01)
*F02D 11/10*   (2006.01)

(52) U.S. Cl.
CPC ......... *F02D 41/2432* (2013.01); *B60W 50/08* (2013.01); *F02D 11/105* (2013.01); *F02D 41/2422* (2013.01); *F02D 41/2477* (2013.01); *F02D 2200/604* (2013.01)

(58) Field of Classification Search
CPC ............. F02D 41/2432; F02D 41/2422; F02D 41/2477; F02D 2200/604; F02D 11/105; B60W 50/08
USPC ........................... 701/99, 101, 102, 110, 115
See application file for complete search history.

(56) References Cited

U.S. PATENT DOCUMENTS

| | | | |
|---|---|---|---|
| 8,526,930 | B2 | 9/2013 | Watkins et al. |
| 8,781,668 | B1 | 7/2014 | Kozloski et al. |
| 8,843,285 | B2 | 9/2014 | Gratton et al. |
| 2013/0184966 | A1 | 7/2013 | Lockwood et al. |
| 2014/0040434 | A1 | 2/2014 | Rybak et al. |

*Primary Examiner* — Hai Huynh
(74) *Attorney, Agent, or Firm* — Julia Voutyras; McCoy Russell LLP

(57) ABSTRACT

Methods and systems are provided for calibrating powertrain output in a vehicle. In one embodiment, a method for a vehicle comprises displaying a multi-parameter powertrain calibration map on a display device, and, responsive to user input, selectively adjusting the displayed calibration map along at least one parameter and not adjusting the calibration map past one or more predetermined thresholds. In this way, a vehicle powertrain system may be optimized according to a user's needs and/or preferences.

20 Claims, 5 Drawing Sheets

METHODS AND SYSTEMS FOR POWERTRAIN CONTROL

FIELD

The present application relates to systems and methods for powertrain control, and more specifically, to calibrating powertrain performance based on user input.

BACKGROUND/SUMMARY

Engine control systems may use various calibration tables and maps to optimize engine and powertrain output as operating conditions change over a drive cycle. For example, vehicle systems may be pre-installed with engine maps that are used by the engine control system to determine how to schedule the various actuators. The calibration maps and tables may be populated with data gathered during engine and powertrain design, testing, and experimentation.

However, such pre-calibration may not cover the plurality of driving styles of consumers and the plurality of environmental conditions to which a single vehicle may be exposed. For example, a pre-calibrated powertrain may perform differently for an aggressive driver and a cautious driver. As another example, a pre-calibrated powertrain may perform differently in cold and warm weather conditions.

In order to avoid the pitfalls of pre-calibrating, some vehicles are configured to self-calibrate based on measurements and feedback collected during vehicle operation. However, such self-calibration may require many driving cycles to complete the calibration. Further, self-calibration may be complicated by multiple drivers sharing the same vehicle.

In addition, self-calibration does not yield any control to a user of the vehicle, who may not care for the pre-calibrated or self-calibrated performance of the vehicle. Such users may turn to tampering with the powertrain system in order to achieve desired performance, thereby potentially voiding a warranty for the vehicle or pushing the vehicle to perform beyond its capabilities.

The inventors herein have devised various solutions to the above problems. In particular, methods and systems for calibrating a powertrain system of a vehicle are provided. In one example, a method for a vehicle comprises displaying a multi-parameter powertrain calibration map on a display device, and, responsive to user input, selectively adjusting the displayed calibration map along at least one parameter and not adjusting the calibration map past one or more predetermined thresholds. In this way, a vehicle powertrain system may be optimized according to a user's needs and/or preferences.

In another example, a method for a vehicle comprises: displaying a multi-parameter engine calibration map on a display device; updating the multi-parameter engine calibration map responsive to and based on user input; and adjusting at least one actuator position based on the updated multi-parameter engine calibration map responsive to an engine start. In this way, user-input calibrations may not be implemented until a vehicle controller is reflashed, thereby ensuring that engine performance is not disrupted during engine operation.

In yet another example, a vehicle system comprises: an engine; a powertrain coupled between the engine and vehicle wheels; and one or more actuators configured to vary a powertrain output. The vehicle system further comprises a controller with computer-readable instructions stored in non-transitory memory that when executed cause the controller to: display a powertrain calibration map on a display device; update the powertrain calibration map responsive to and based on user input; and adjust a setting of at least one of the one or more actuators based on the updated powertrain calibration map. In this way, a user may calibrate the performance of his or her vehicle without directly performing adjustments "under the hood" and without connecting a device to the vehicle's diagnostics port.

The above advantages and other advantages and features of the present description will be readily apparent from the following detailed description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
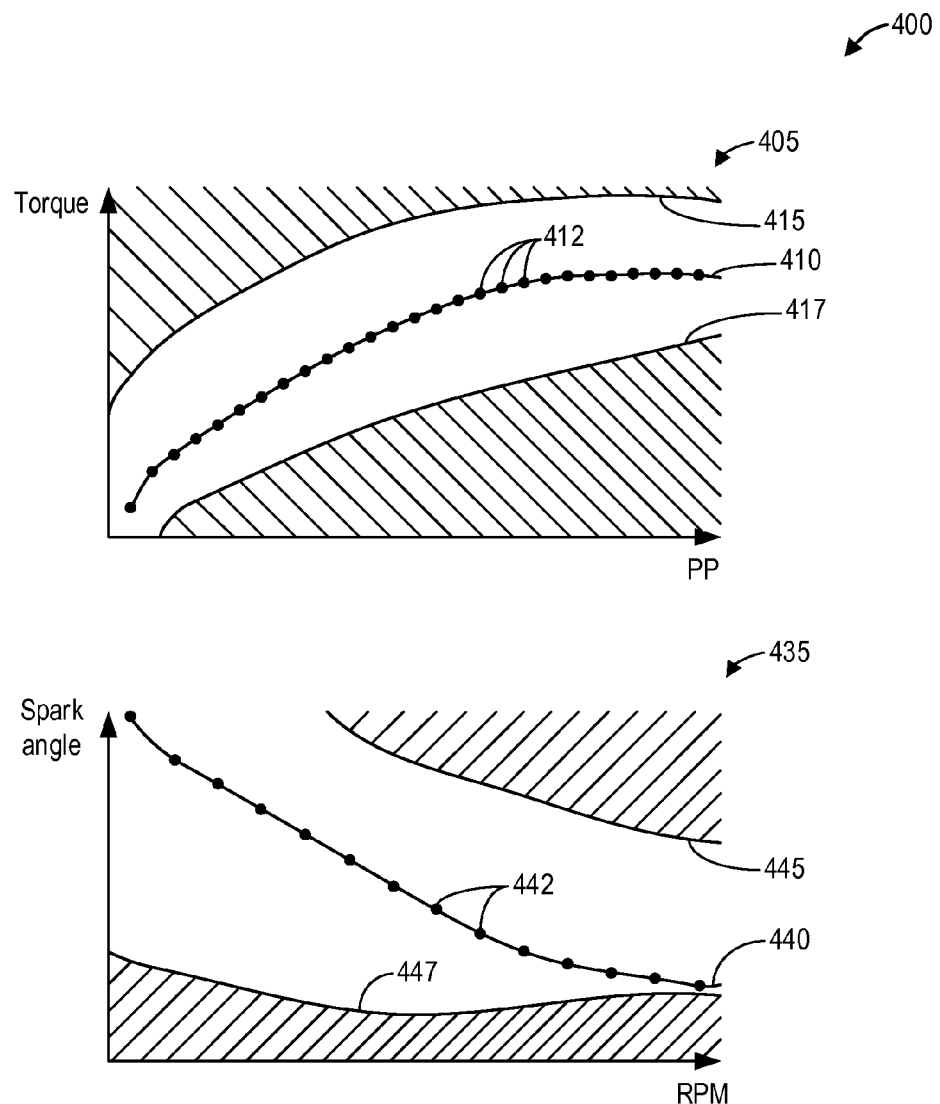
FIG. 4 shows a set of graphs illustrating example calibration maps.
Figure 5:
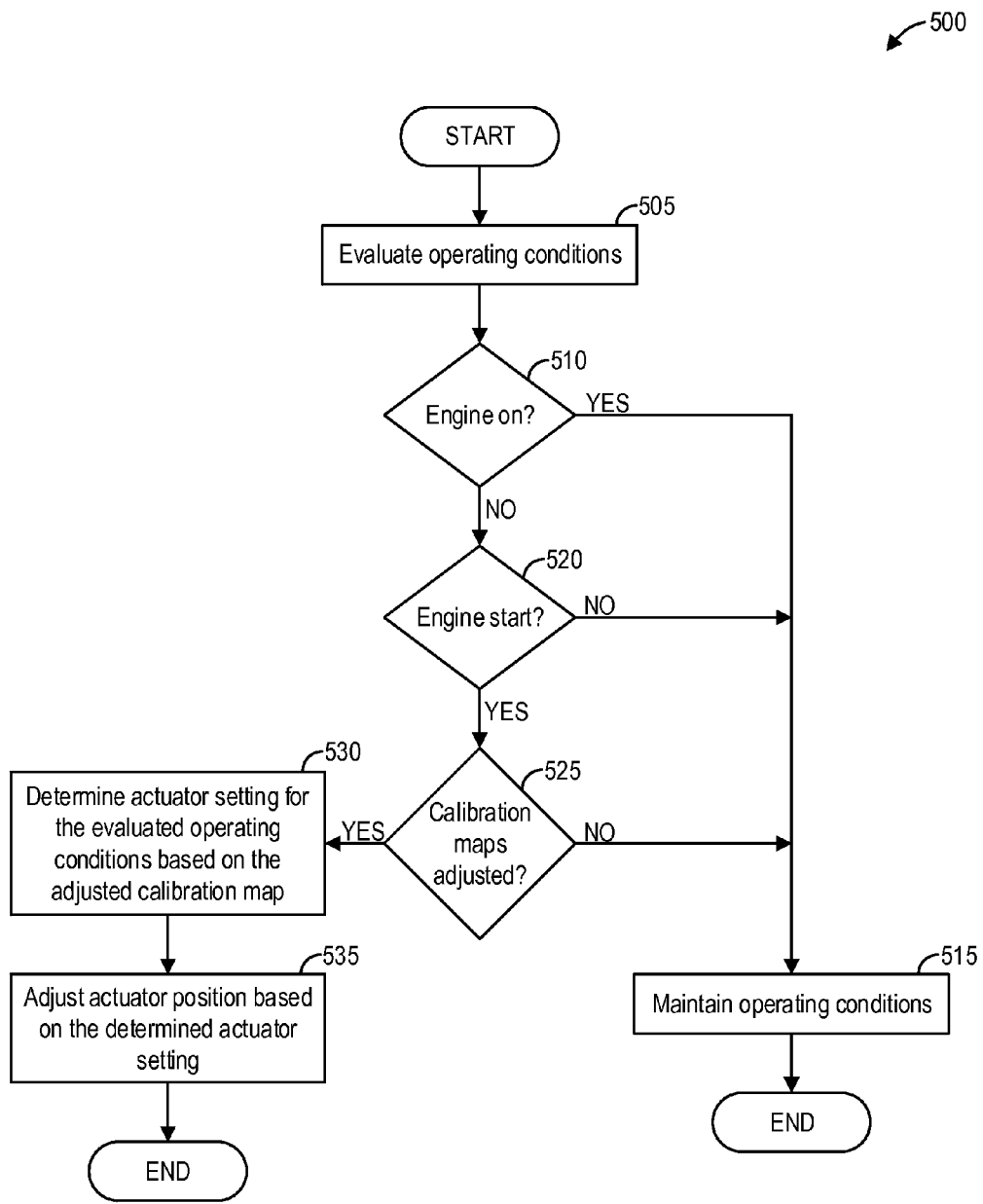
FIG. 5 shows a high-level flow chart illustrating an example method for adjusting actuator settings based on an adjusted calibration map.

The present description is related to calibrating a powertrain system. Specifically, methods and systems are provided for calibrating powertrain output in a vehicle system, such as the vehicle system of FIG. 1. In one non-limiting example, the engine may be configured as illustrated in FIG. 2, wherein the engine includes at least one cylinder, a control system, a turbocharger, and an exhaust gas recirculation system, among other features. An engine controller may be configured to perform a control routine, such as the routine of FIG. 3, to update a powertrain calibration according to user input. Regarding terminology, the term powertrain may be considered herein to comprise the components of a vehicle which generate power and transfer the generated power to a surface, such as a road, and in this view a powertrain may comprise at least an engine, transmission, and wheels. Example powertrain calibration maps which may be adjusted and updated by a user are shown in FIG. 4. After adjusting powertrain calibration maps, actuator settings and positions may be adjusted according to the adjusted powertrain calibration maps as depicted in FIG. 5.

Figure 1:
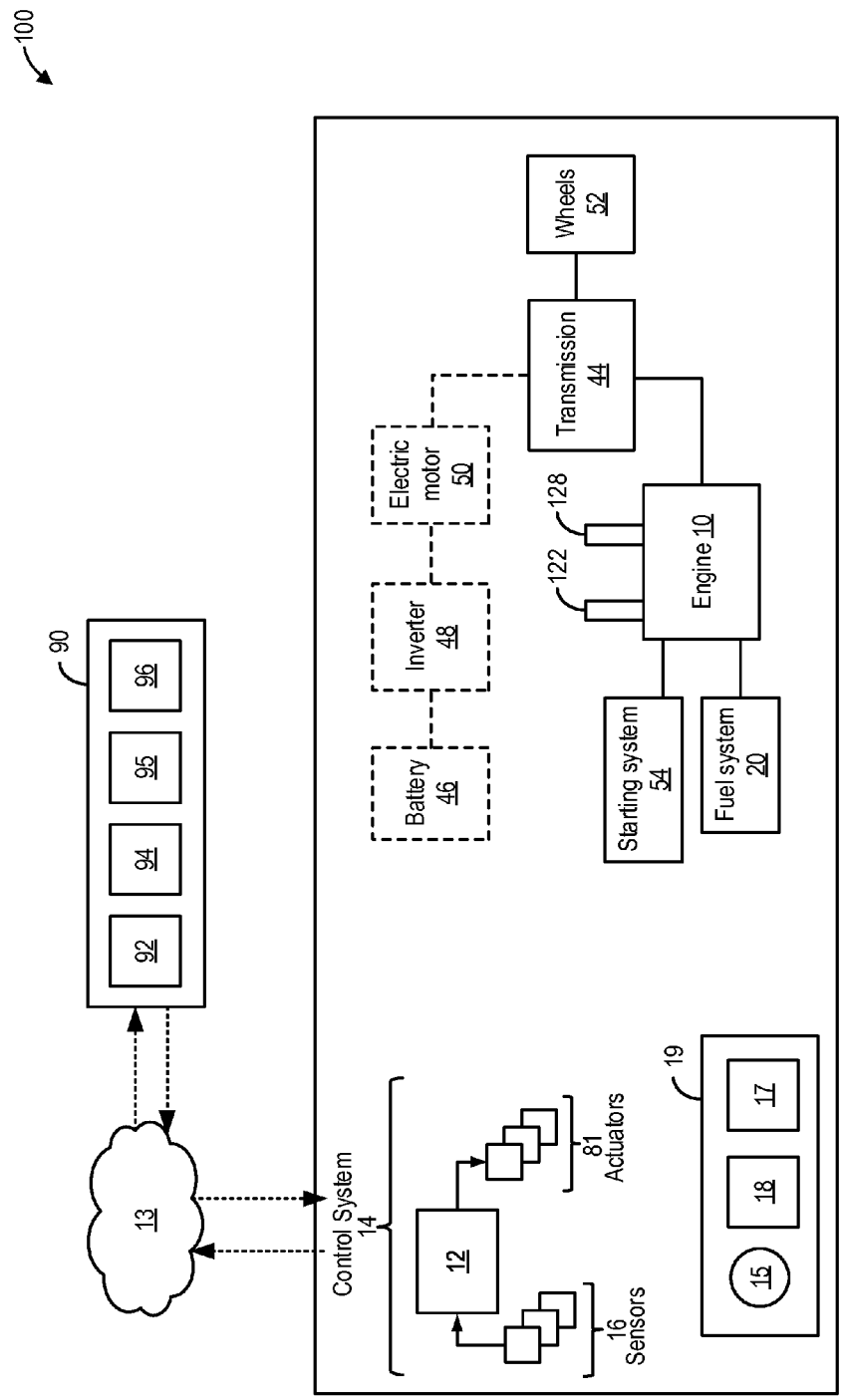
FIG. 1 shows a high-level block diagram illustrating an example vehicle system.
Figure 2:
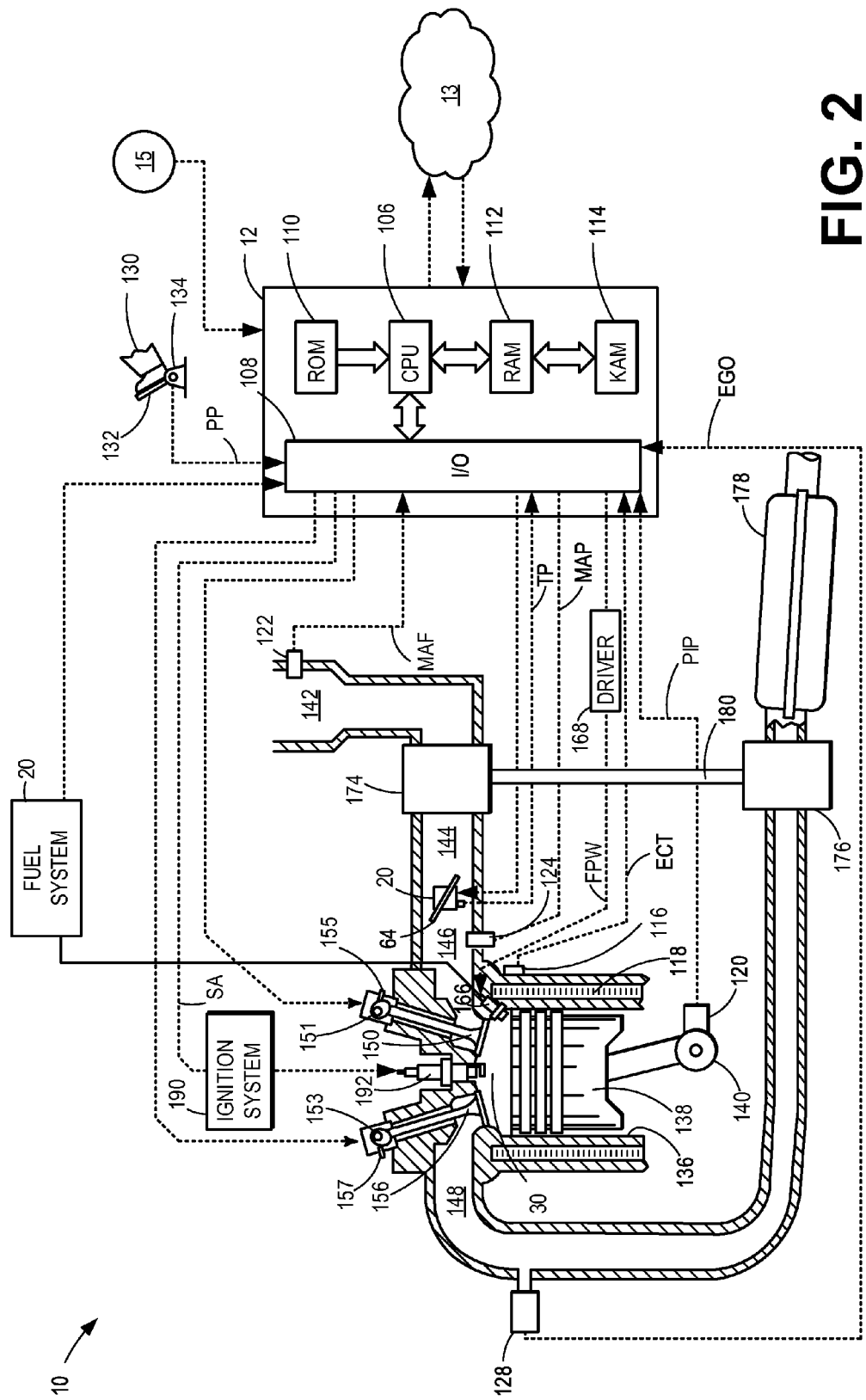
FIG. 2 shows a high-level block diagram illustrating an example partial engine view.

FIG. 1 depicts a vehicle system 100 including an internal combustion engine 10 coupled to transmission 44. Engine 10 may be started with an engine starting system 54, including a starter motor. Transmission 44 may be a manual transmission, automatic transmission, or combinations thereof. Transmission 44 may include various components including but not limited to a torque converter, a final drive unit, a gear set having a plurality of gears, and so on. Transmission 44 is shown coupled to drive wheels 52, which may contact a road surface.

In one embodiment, vehicle system 100 may be a hybrid vehicle wherein transmission 44 may alternatively be driven by an electric motor 50. For example, the motor may be a battery-powered electric motor (as depicted) wherein electric motor 50 is powered by energy stored in battery 46. Other energy storage devices that may be used to power motor 50 include a capacitor, a flywheel, a pressure vessel, and so on. An energy conversion device, herein inverter 48, may be configured to convert the DC output of battery 46 into an AC output for use by electric motor 50. Electric motor 50 may also be operated in a regenerative mode, that is, as a generator, to absorb energy from vehicle motion and/or the engine and convert the absorbed energy to an energy form suitable for storage in battery 46. Furthermore, electric motor 50 may be operated as a motor or generator, as required, to augment or absorb torque during a transition of engine 10 between different combustion modes (e.g., during transitions between a spark ignition mode and a compression ignition mode).

When configured in the hybrid embodiment, vehicle system 100 may be operated in various modes wherein the vehicle is driven by only the engine, only the electric motor, or a combination thereof. Alternatively, assist or mild hybrid modes may also be employed, wherein the engine 10 is the primary source of torque, and the electric motor 50 selectively adds torque during specific conditions, such as during a tip-in event. For example, during an "engine-on" mode, engine 10 may be operated and used as the primary source of torque for powering wheels 52. During the "engine-on" mode, fuel may be supplied to engine 10 from fuel system 20 including a fuel tank. The fuel tank may hold a plurality of fuels, such as gasoline, or fuel blends, such as a fuel with a range of alcohol (e.g., ethanol) concentrations including E10, E85, and so on, and combinations thereof. In another example, during an "engine-off" mode, electric motor 50 may be operated to power the wheels 52. The "engine-off" mode may be employed during braking, low speeds, while stopped at traffic lights, and so on. In still another example, during an "assist" mode, an alternate torque source may supplement and act in cooperation with the torque provided by engine 10.

Vehicle system 100 may further include control system 14. Control system 14 is shown receiving information from a plurality of sensors 16 and sending control signals to a plurality of actuators 81. The control system 14 may further include a controller 12. The controller 12 may receive input data from the various sensors 16 or buttons, process the input data, and trigger the actuators 81 in response to the processed input data based on instructions or code programmed therein corresponding to one or more routines. Example control routines are described herein with regard to FIGS. 3 and 5.

The control system 14 may be communicatively coupled to an off-board remote computing device 90 via a wireless network 13, which may comprise Wi-Fi, Bluetooth, a type of cellular service, a wireless data transfer protocol, and so on. The remote computing device 90 may comprise, for example, a processor 92 for executing instructions, a memory 94 for storing said instructions, a user interface 95 for enabling user input (e.g., a keyboard, a touch screen, a mouse, a microphone, a camera, etc.), and a display 96 for displaying graphical information. As such, the remote computing device 90 may comprise any suitable computing device, such as a personal computer (e.g., a desktop computer, a laptop, a tablet, etc.), a smart device (e.g., a smart phone, etc.), and so on. As described further herein with regard to FIG. 3, the control system 14 may be configured to transmit powertrain calibration maps via network 13 to the remote computing device 90, which in turn may display the powertrain calibration maps via display 96. A user of the remote computing device 90 may adjust parameter settings in the powertrain calibration maps via user interface 95. The remote computing device 90 may transmit the adjusted powertrain calibration maps, or in some cases only the adjusted parameters, back to the control system 14. As described further herein with regard to FIG. 5, the control system 14 may in turn update actuator settings based on the adjusted powertrain calibration maps. In this way, a user of remote computing device 90 may adjust and tune the powertrain configuration and performance according to his or her preferences.

Vehicle system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle.

Dashboard 19 may further include a display system 18 configured to display information to the vehicle operator. Display system 18 may comprise, as a non-limiting example, a touchscreen display which enables the vehicle operator to view graphical information as well as input commands. In some examples, a powertrain calibration map may be displayed via display system 18 for on-board adjustments to the powertrain calibration. For example, as described further herein with regard to FIG. 3, the vehicle operator may adjust parameter settings in the powertrain calibration maps to achieve a desired powertrain output. As a result, as described further herein with regard to FIG. 5, the controller 12 may update actuator settings based on the adjusted parameter settings and powertrain calibration maps.

Dashboard 19 may further include an operator ignition interface 15 via which the vehicle operator may adjust the ignition status of the vehicle engine 10. Specifically, the operator ignition interface 15 may be configured to initiate and/or terminate operation of the vehicle engine 10 based on an operator input. Various embodiments of the operator ignition interface 15 may include interfaces that require a physical apparatus, such as an active key, that may be inserted into the operator ignition interface 15 to start the engine 10 and turn on the vehicle, or may be removed to shut down the engine 10 and turn off the vehicle. Other embodiments may include a passive key that is communicatively coupled to the operator ignition interface 15. The passive key may be configured as an electronic key fob or a smart key that does not have to be inserted or removed from the ignition interface 15 to operate the vehicle engine 10. Rather, the passive key may need to be located inside or proximate to the vehicle (e.g., within a threshold distance of the vehicle). Still other embodiments may additionally or optionally use a start/stop button that is manually pressed by the operator to start or shut down the engine 10 and turn the vehicle on or off. Based on the configuration of the operator ignition interface 15, a vehicle operator may provide an indication as to whether the engine 10 is in an engine-on or engine-off condition, and further whether the vehicle is in a vehicle-on or a vehicle-off condition.

Controller 12 may also receive an indication of the ignition status of engine 10 from an ignition sensor (not shown) coupled to the operator ignition interface 15. Control system 14 may be configured to send control signals to the actuators 81 based on input received from the sensors and the vehicle operator. The various actuators may include, for example, cylinder fuel injectors, an air intake throttle coupled to the engine intake manifold, a spark plug, and so on. As described further herein with regard to FIG. 5, the actuator positions may be adjusted for optimal or desired vehicle powertrain output during engine operation based on calibration data updated based on user-input powertrain calibration adjustments.

FIG. 2 depicts an example embodiment of a combustion chamber or cylinder of engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. As another example, input regarding a vehicle-on and/or engine-on condition may be received via driver ignition interface 15, as previously discussed with reference to FIG. 1. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 64 may be provided along an intake passage of the engine for varying the flow rate and/or pressure of intake air provided to the engine cylinders. For example, throttle 20 may be disposed downstream of compressor 174, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three-way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Furthermore, exhaust temperature may be computed by one or more exhaust gas sensors 128. It may be appreciated that the exhaust gas temperature may alternatively be estimated by a combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controller by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock or pre-ignition suppressing fluid thereto. In some embodiments, the fluid may be a fuel, wherein the injector is also referred to as a fuel injector. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereinafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from a high-pressure fuel system 20 including fuel tanks, fuel pumps, and a fuel rail. Alternatively, fuel may be delivered by a single-stage fuel pump at lower pressure, in which case the timing of the direct fuel injection may be more limited during the compression stroke than if a high-pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such, each cylinder may similarly include its own set of intake/exhaust valves, fuel injector(s), spark plug, and so on.

Fuel tanks in fuel system 20 may hold fuel with different qualities, such as different compositions. These differences may include different alcohol content, different octane, different heat of vaporizations, different fuel blends, and/or combinations thereof. In one example, fuels with different alcohol contents could include one fuel being gasoline and the other being ethanol or methanol. In another example, the engine may use gasoline as a first substance and an alcohol-containing fuel blend such as E85 (which is approximately 85% ethanol and 15% gasoline) or M85 (which is approximately 85% methanol and 15% gasoline) as a second substance. Other alcohol-containing fuels could be a mixture of alcohol and water, a mixture of alcohol, water, and gasoline, and so on.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. As discussed at FIG. 1, the vehicle control system which includes controller 12 may be communicatively coupled to a remote computing device 90 via a wireless network 13. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124; cylinder AFR from EGO sensor 128; and abnormal combustion from a knock sensor. Engine speed signal, RPM, may be generated by controller 12 from signal PIP. Manifold pressure signal MAP from a manifold pressure sensor may be used to provide an indication of vacuum, or pressure, in the intake manifold. The controller may also receive operator input and indication regarding the ignition status of the engine from an operator ignition interface 15.

Storage medium read-only memory 110 can be programmed with computer-readable data representing instructions executable by processor 106 for performing the methods described herein below as well as other variants that are anticipated but not specifically listed. Example routines are described herein with reference to FIGS. 3 and 5.

Figure 3:
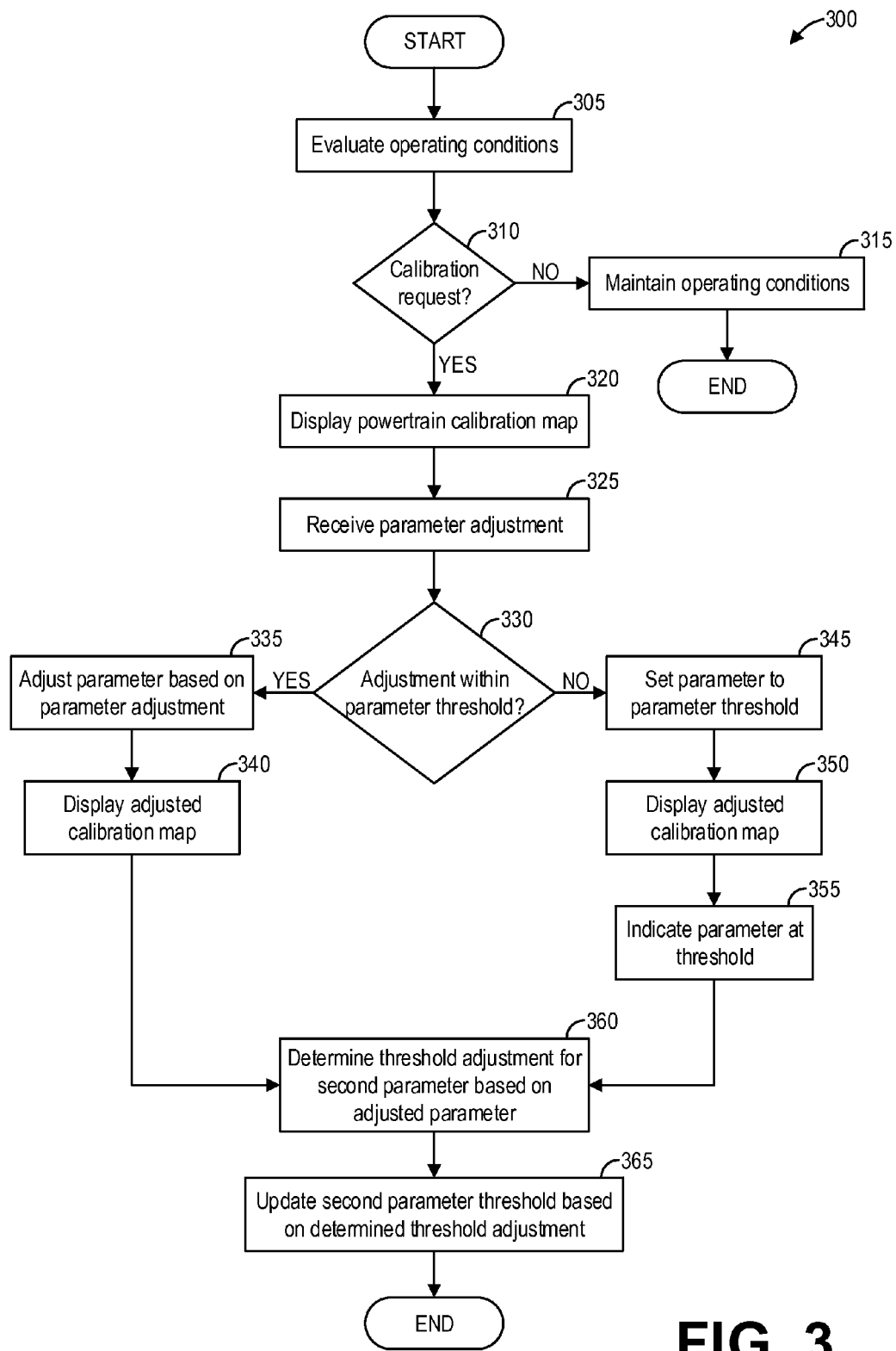
FIG. 3 shows a high-level flow chart illustrating an example method for updating a powertrain calibration map.

FIG. 3 shows a high-level flow chart illustrating an example method 300 for adjusting a powertrain calibration map according to an embodiment of the invention. In particular, method 300 relates to adjusting a powertrain calibration map based on user input. Method 300 may be carried out using the systems and components described hereinabove with regard to FIGS. 1 and 2, however it should be understood that the method may be applied to other systems and components without departing from the scope of the present disclosure.

Method 300 may begin at 305. At 305, method 300 may include evaluating operating conditions. Evaluating operating conditions may comprise estimating and/or calculating, for example, engine operating conditions. Such conditions may include, for example, engine speed, engine temperature, operator torque demand, boost demand, ambient conditions, exhaust temperature, and so on.

At 310, method 300 may include receiving a calibration request. A calibration request may comprise, for example, a request to calibrate one or more operating parameters. In some examples, such a request may be placed on-board. For example, an on-board request may be performed by pressing a button on the dashboard 19, where the button may comprise a hard button (e.g., a physical button positioned on the dashboard 19) or a soft button (e.g., a predesignated region of a touchscreen display 18). As another example, an on-board request may be performed via a voice command received by the dashboard 19. In some examples, the calibration request may be placed off-board. For example, an off-board request may be performed using a remote computing device 90 communicatively coupled to the vehicle via wireless network 13, such as a smart phone or a personal computer.

If a calibration request is not received, method 300 may continue to 315. At 315, method 300 may include maintaining operating conditions, such as the operating conditions evaluated at 305. Method 300 may then end. In this way, method 300 may not continue unless a calibration request is received, and normal vehicle operation may continue.

However, returning to 310, if a calibration request is received, method 300 may continue to 320. At 320, method 300 may include displaying a powertrain calibration map. The powertrain calibration map may be displayed via display 18 if the calibration request is performed on-board, for example via dashboard 19. As another example, the powertrain calibration map may be displayed via display 96 on the remote computing device 90. For example, the powertrain calibration map may be displayed on a remote computing device 90 responsive to receiving the calibration request from the remote computing device 90. The powertrain calibration map may be displayed as a three-dimensional map, a contour map, a graph, a table, or any other suitable graphical format. For example, the powertrain calibration map may be plotted as a three-dimensional map as a function of at least three operating conditions, the operating conditions including but not limited to at least three of engine speed, engine load, engine temperature, barometric pressure, fuel alcohol content, ambient humidity, and so on.

The powertrain calibration map may include data points corresponding to one or more operating parameters recorded during engine operation. For example, the displayed powertrain calibration map may include data points acquired during specified conditions, such as temperature, location, highway vs. freeway driving, and so on. In this way, a user may adjust calibration maps for particular conditions, such as cold weather driving versus warm weather driving. Furthermore, the calibration map may include parameters specified by the user. For example, the user may desire to adjust torque based on pedal position, and so the calibration map may comprise a graphical representation of torque data points as a function of pedal position data points. In such an example, the data points may comprise average values of data acquired over a period of time and/or under specified conditions. As a non-limiting example, a user may specify or request a powertrain calibration table based on data acquired while the vehicle was driven a long distance on a highway on a warm day in order to, say, optimize fuel economy while operating the vehicle during such conditions.

At 325, method 300 may include receiving a parameter adjustment. A parameter adjustment may comprise a new value for a selected operating parameter. In some examples, an adjustment for a parameter may be selected relative to another parameter. For example, a desired torque may be selected based on a pedal position (PP). A parameter adjustment may comprise a plurality of selected values relative to one or more different parameters. In some examples, parameter adjustments may be constrained such that the adjustment of a parameter at a single value may affect the neighboring values of the same parameter. Such constraints may impose a linearity and/or continuity upon the parameters.

At 330, method 300 may include determining if the received parameter adjustment is within a parameter threshold. Parameter thresholds may comprise physical limitations, safety limitations, manufacturer-imposed limitations, government-mandated limitations, combinations thereof, and so on.

If the adjustment is within the parameter threshold, method 300 may continue to 335. At 335, method 300 may include adjusting the parameter based on the received parameter adjustment. Adjusting the parameter may comprise updating the parameter in the active calibration map stored in non-transitory memory of the controller 12. After the calibration map is updated, subsequent control of the vehicle may be based on the updated calibration map including the adjusted parameter.

After adjusting the parameter based on the parameter adjustment, method 300 may continue to 340. At 340, method 300 may include displaying an adjusted calibration map. The adjusted calibration map may be displayed via the same display utilized at 320, for example, an on-board display such as display 18 or an off-board display such as display 96. Displaying the adjusted calibration map may comprise displaying a powertrain calibration map including the updated values, including any parameter adjustments automatically generated based on the input parameter adjustment. Further, in some examples, displaying the adjusted calibration map may include indicating the difference between the adjusted calibration map and the pre-adjustment calibration map. Additionally or alternatively, displaying the adjusted calibration map may include indicating that the displayed calibration map comprises an adjusted calibration map. For example, such an indication may comprise ephemerally displayed text, an audio message or tone, and so on indicating that the adjustment was successful.

Returning to 330, if the adjustment is not within the parameter threshold, method 300 may continue to 345. At 345, method 300 may include setting the parameter to the parameter threshold. In examples wherein a plurality of parameter adjustments are input, setting the parameter to the parameter threshold may comprise setting one or more of the adjusted parameters to the parameter threshold responsive to the one or more adjusted parameters not within the parameter threshold. For example, if a subset of the input parameter adjustments are within the parameter threshold while the complementary subset of input parameter adjustments are not within the parameter threshold, the parameters corresponding to the complementary subset of input parameter adjustments not within the parameter threshold may be set to the parameter threshold, while the parameters corresponding to the subset of input parameter adjustments within the parameter threshold may be adjusted according to the input parameter adjustments. In this way, the parameter may saturate. As discussed above with regard to the parameter thresholds, such saturation may be artificially imposed.

After setting the parameter to the parameter threshold, method 300 may continue to 350. At 350, method 300 may include displaying an adjusted calibration map. The adjusted calibration map may be displayed on the remote display device 96 or the on-board display system 18. At 355, method 300 may include indicating that the parameter is at the threshold. Indicating that the parameter is at the threshold may include, for example, highlighting the adjusted parameter on the displayed adjusted calibration map. Additionally or alternatively, indicating that the parameter is at the threshold may include displaying a message, generating an audio message and/or tone, combinations thereof, and so on.

At 360, method 300 may include determining a threshold adjustment for a second parameter based on the adjusted parameter. For example, the displayed powertrain calibration map may include a first parameter as a function of a second parameter even though the first parameter may further depend on a third parameter, the third parameter not included in the displayed powertrain calibration map. Based on such interdependence between the first parameter and the third parameter, the third parameter may be automatically adjusted based on the adjustment to the first parameter. In examples wherein the third parameter itself is automatically adjusted, an alert may be generated to inform the user of the adjustment to the third parameter. In some examples, the third parameter may not be adjusted based on the adjustment to the first parameter. Instead, one or more thresholds for the third parameter may be adjusted based on the adjustment to the first parameter. In some examples, the adjustment of the parameter thresholds may be indicated to the user.

At 365, method 300 may include updating the second parameter threshold based on the determined threshold adjustment. In this way, subsequent adjustments to other parameters, including the second parameter, may be consistent with the parameter adjustments performed at 335. Method 300 may then end.

FIG. 4 shows a set of graphs 400 that illustrate non-limiting example powertrain calibration maps according to an embodiment of the invention. In particular, the set of graphs 400 comprise example two-dimensional powertrain calibration maps which may be displayed to a user via, for example, display 18 and/or 96 to enable a user to adjust powertrain calibration.

Graph 405 includes a plot 410 of torque versus pedal position (PP), where torque comprises, for example, the torque output by the engine to the transmission. As displayed, the plot 410 of torque versus pedal position is plotted along data points 412, where data points 412 comprise a current calibration of the vehicle. In one example, the data points 412 comprise an average of data points acquired over a time interval, where the time interval may be specified by the user or may be predetermined. In another example, the data points 412 comprise data acquired during one or more specified conditions. For example, if the user would like to calibrate the powertrain for cold driving conditions, the data points 412 may comprise data acquired when ambient temperature is below a threshold temperature or within a threshold range specified by the user. Plot 410 may comprise a specified calibration such that a user may adjust the calibration by adjusting plot 410. For example, the user may increase and/or decrease the torque response to pedal position by adjusting the plot 410. The user may adjust the plot

410 by, for example, dragging a point of the plot 410 with a finger or stylus in examples where the powertrain calibration map is displayed on a touchscreen display system. In other examples, the user may adjust the plot 410 using any suitable user input technology, such as a keyboard, mouse, trackball, microphone, and so on.

Graph 405 further includes upper threshold 415 and lower threshold 417 which bound the possible calibrations. In particular, adjustments to the calibration plot 410 are limited to the region between the upper threshold 415 and the lower threshold 417. The upper threshold 415 and the lower threshold 417 may be determined based on physical limitations. For example, the range of pedal position is physically constrained by the design of the acceleration pedal while the engine torque output is physically constrained by the design of the engine. The thresholds may be further based on the calibration of other parameters. For example, the engine torque output may be constrained by the calibration of spark timing, valve timing, and so on.

The set of graphs 400 also includes graph 435 which comprises a plot 440 of spark angle versus rotations per minute (RPM). As displayed, plot 440 of spark angle versus RPM is plotted along data points 442, where data points 442 comprise a current calibration of the vehicle. Graph 435 further includes an upper threshold 445 and a lower threshold 447.

As described herein above with regard to FIG. 3, adjusting the calibration of one or more parameters may influence the calibration of one or more additional parameters. For example, adjusting the calibration plot 440 of spark angle versus RPM may affect the upper threshold 415 and/or the lower threshold 417 of graph 405, thereby constraining the possible calibration of torque.

FIG. 5 shows a high-level flow chart illustrating an example method 500 for updating actuator settings according to an embodiment of the invention. In particular, method 500 relates to updating actuator settings based on a powertrain calibration map, where the powertrain calibration map is adjusted as described herein above.

Method 500 may begin at 505. At 505, method 500 may include evaluating operating conditions. Evaluating operating conditions may comprise estimating and/or calculating engine operating conditions, for example. Operating conditions may include, but are not limited to, engine speed, engine temperature, engine load, operator torque demand, boost pressure, ambient conditions, exhaust temperature, vehicle location, and so on.

At 510, method 500 may include determining if the engine is on. In some examples, adjustments to a calibration map may go into effect upon an engine start. As a result, adjustments made to a calibration table while the engine is on may not immediately result in any actuator adjustments. In this way, erratic powertrain behavior may be avoided. Thus, if the engine is on, method 500 may continue to 515. At 515, method 500 may include maintaining operating conditions, such as the operating conditions evaluated at 505. Method 500 may then end.

Returning to 510, if the engine is not on, method 500 may continue to 520. At 520, method 500 may include determining if an engine start has occurred. If an engine start has not occurred, method 500 may continue to 515. At 515, method 500 may include maintaining operating conditions. For example, the engine may remain off. Method 500 may then end.

Returning to 520, if an engine start has occurred, method 500 may continue to 525. At 525, method 500 may include determining if the calibration maps are adjusted. If the calibration maps are not adjusted, method 500 may continue to 515. At 515, method 500 may include maintaining operating conditions. Method 500 may then end.

However, if the calibration maps are adjusted, method 500 may continue to 530. At 530, method 500 may include determining an actuator setting for the evaluated operating conditions based on the adjusted calibration map.

At 535, method 500 may include adjusting an actuator position based on the determined actuator setting. In particular, the controller 12 may adjust one or more vehicle powertrain actuators based on the determined settings. This may include adjusting one or more of engine actuator output, transmission actuator output, and hybrid electric motor output. Engine actuator output settings adjusted may include, but are not limited to, one or more of valve timing, cam timing, injection timing, injection amount, spark advance, EGR rate, boost pressure, and so on. Likewise, transmission actuator output settings adjusted may include, but is not limited to, one or more of a transmission gear selection, transmission clutch pressure, torque converter clutch pressure, electric oil pump pressure, line pressures, and solenoid response times, transmission line pressure, shift solenoid characteristics, torque convertor lock-up or slip rates, and so on. Hybrid electric motor output may include, but is not limited to, motor controller torque command and so on. Method 500 may then end.

In this way, powertrain calibration data adjusted by users on a vehicle may be utilized to adjust the vehicle powertrain output of a given vehicle.

In one embodiment, a method for a vehicle comprises displaying a multi-parameter powertrain calibration map on a display device, and, responsive to user input, selectively adjusting the displayed calibration map along at least one parameter and not adjusting the calibration map past one or more predetermined thresholds. In one example, the method further comprises adjusting a threshold for one or more other parameters. As an example, the method further comprises adjusting a threshold for one or more other parameters, wherein the map is visually displayed on a screen visible to a driver sitting in a driver seat of the vehicle in a conventional driving position facing a steering wheel and with feet forward. Additionally or alternatively, in another example, the method further comprises adjusting one or more other parameters based on the adjustments to the at least one parameter, and operating the engine of the vehicle via a controller during vehicle operation to adjust one or more engine actuators in response to the adjusted calibration map, wherein the user input occurs while the vehicle is in a stationary and shut-down condition.

In one example, the display device comprises a vehicle display device. In another example, the display device comprises an off-board display device, where the off-board display device is wirelessly, communicatively connected to the vehicle.

In some examples, the powertrain calibration map comprises one of a contour map, a three-dimensional map, a table, and a two-dimensional graph. In some examples, the powertrain calibration map comprises data points recorded during engine operation. In one example, the method further comprises adjusting one or more calibration maps based on the adjusted powertrain calibration map, where the one or more calibration maps are not displayed on the display device.

In some examples, the method further comprises adjusting actuators based on the adjusted powertrain calibration map. In one example, adjusting the actuators based on the adjusted powertrain calibration map is automatically performed upon engine start.

In another embodiment, a method for a vehicle comprises: displaying a multi-parameter engine calibration map on a display device; updating the multi-parameter engine calibration map responsive to and based on user input; and adjusting at least one actuator position based on the updated multi-parameter engine calibration map responsive to an engine start. In one example, the multi-parameter engine calibration map comprises a plurality of data points recorded during engine operation.

In one example, the display device comprises a vehicle display device. In another example, the display device comprises an off-board display device, the off-board display device wirelessly connected to the vehicle.

In one example, the user input comprises at least one adjustment to at least one parameter, and updating the multi-parameter engine calibration map based on the user input comprises adjusting the multi-parameter engine calibration map along the at least one parameter according to the at least one adjustment.

In yet another embodiment, a vehicle system comprises: an engine; a powertrain coupled between the engine and vehicle wheels; and one or more actuators configured to vary a powertrain output. The vehicle system further comprises a controller with computer-readable instructions stored in non-transitory memory that when executed cause the controller to: display a powertrain calibration map on a display device; update the powertrain calibration map responsive to and based on user input; and adjust a setting of at least one of the one or more actuators based on the updated powertrain calibration map.

In one example, the vehicle system further comprises a communication module for wirelessly coupling the vehicle system to an off-board display device, wherein the display device comprises the off-board display device. As another example, the display device is positioned at a dashboard of the vehicle system. In such an example, the display device comprises an on-board display device.

In one example, the setting of the at least one of the one or more actuators is adjusted based on the updated powertrain calibration map responsive to the engine turning on. In yet another example, the powertrain calibration map comprises a plurality of data points acquired during engine operation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer-readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
  displaying, via a controller of the vehicle, a multi-parameter powertrain calibration map on a display device; and
  responsive to user input, selectively adjusting, via the controller, the displayed calibration map along at least one parameter and not adjusting the calibration map past one or more predetermined thresholds.

2. The method of claim 1, further comprising adjusting, via the controller, a threshold for one or more other parameters, wherein the calibration map is visually displayed on a screen visible to a driver sitting in a driver seat of the vehicle in a conventional driving position facing a steering wheel and with feet forward.

3. The method of claim 1, further comprising adjusting, via the controller, one or more other parameters based on the adjustments to the at least one parameter, and operating an engine of the vehicle via the controller during vehicle operation to adjust one or more engine actuators in response to the adjusted calibration map, wherein the user input occurs while the vehicle is in a stationary and shut-down condition.

4. The method of claim 1, wherein the display device comprises a vehicle display device.

5. The method of claim 1, wherein the display device comprises an off-board display device, the off-board display device wirelessly connected to the vehicle.

6. The method of claim 1, wherein the powertrain calibration map comprises one of a contour map, a three-dimensional map, a table, and a two-dimensional graph.

7. The method of claim 1, further comprising adjusting, via the controller, one or more calibration maps based on the adjusted powertrain calibration map, the one or more calibration maps not displayed on the display device.

8. The method of claim 1, further comprising adjusting, via the controller, actuators based on the adjusted powertrain calibration map.

9. The method of claim 8, wherein adjusting the actuators based on the adjusted powertrain calibration map is automatically performed upon engine start.

10. The method of claim 1, wherein the powertrain calibration map comprises data points recorded during engine operation.

11. A method for a vehicle, comprising:
displaying, via a controller of the vehicle, a multi-parameter engine calibration map on a display device;
updating, via the controller, the multi-parameter engine calibration map responsive to and based on user input; and
adjusting, via the controller, at least one actuator position based on the updated multi-parameter engine calibration map responsive to an engine start.

12. The method of claim 11, wherein the multi-parameter engine calibration map comprises a plurality of data points recorded during engine operation.

13. The method of claim 11, wherein the display device comprises a vehicle display device.

14. The method of claim 11, wherein the display device comprises an off-board display device, the off-board display device wirelessly connected to the vehicle.

15. The method of claim 11, wherein the user input comprises at least one adjustment to at least one parameter, and wherein updating the multi-parameter engine calibration map based on the user input comprises adjusting the multi-parameter engine calibration map along the at least one parameter according to the at least one adjustment.

16. A vehicle system, comprising:
an engine;
a powertrain coupled between the engine and vehicle wheels;
one or more actuators configured to vary a powertrain output; and
a controller with computer-readable instructions stored in non-transitory memory that when executed cause the controller to:
display a powertrain calibration map on a display device;
update the powertrain calibration map responsive to and based on user input; and
adjust a setting of at least one of the one or more actuators based on the updated powertrain calibration map.

17. The system of claim 16, further comprising a communication module for wirelessly coupling the vehicle system to an off-board display device, and wherein the display device comprises the off-board display device.

18. The system of claim 16, wherein the display device is positioned at a dashboard of the vehicle system.

19. The system of claim 16, wherein the setting of the at least one of the one or more actuators is adjusted based on the updated powertrain calibration map responsive to the engine turning on.

20. The system of claim 16, wherein the powertrain calibration map comprises a plurality of data points acquired during engine operation.

* * * * *